Figure 1:
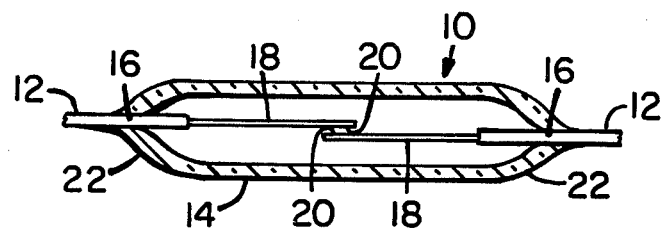

United States Patent [19]

Morgan

[11] 3,961,970

[45] June 8, 1976

[54] REED SWITCH CONSTRUCTION

[75] Inventor: David W. Morgan, Corning, N.Y.

[73] Assignee: Corning Glass Works, Corning, N.Y.

[22] Filed: Apr. 21, 1975

[21] Appl. No.: 570,250

[52] U.S. Cl. .................................. 106/52; 313/221
[51] Int. Cl.² ....................... C03C 3/04; C03C 3/10
[58] Field of Search ...................................... 106/52

[56] References Cited
UNITED STATES PATENTS

| | | | |
|---|---|---|---|
| 3,698,921 | 10/1972 | LaGrouw | 106/52 |
| 3,808,154 | 4/1974 | Omori | 106/52 |
| 3,814,612 | 6/1974 | Inoue et al. | 106/52 |

*Primary Examiner*—Winston A. Douglas
*Assistant Examiner*—Mark Bell
*Attorney, Agent, or Firm*—Milton M. Peterson; Clinton S. Janes, Jr.; Clarence R. Patty, Jr.

[57] ABSTRACT

A reed switch construction is disclosed in which the glass envelope has thermal expansion characteristics matching those of the reeds below the glass setting point, has relatively high electrical resistivity and low devitrification tendencies, and is, in percent by weight, composed essentially of 53–59% $SiO_2$, 3–7% $Al_2O_3$, 20–25% $Na_2O + K_2O$ with the $K_2O:Na_2O$ ratio being greater than 1:1 on a weight basis, 7–10% BaO, 2–6% ZnO and 1–5% $Fe_2O_3$.

1 Claim, 2 Drawing Figures

REED SWITCH CONSTRUCTION

BACKGROUND OF THE INVENTION

The present invention relates to a new reed switch construction, and more particularly to a novel glass envelope for use in such construction.

A reed switch is a magnetically controlled switch that automatically makes, breaks, or holds contact in an electrical circuit. Such switches are widely used for electrical circuit control, particularly in the communications field.

The conventional form of dry reed switch includes two magnetic metal reeds which have overlapping, flat, end portions separated by a small gap when the switch is open. The reeds are hermetically sealed in opposite ends of a tubular glass envelope filled with an inert atmosphere. When a magnetic field is applied to such a switch, the flat, overlapping portions of the reeds are attracted to each other, thus closing the switch and conducting an electric current. The reeds are caused to separate, thus opening the circuit, upon removal of the magnetic field. Good electrical contact is assured by plating a thin layer of precious metal over the flat contact portions of the reeds.

In production, a metal reed is inserted in each end of a glass tube and the end of the tube thermally softened to collapse about and seal to a shank portion on the reed. This sealing operation has been greatly facilitated by drawing the tubular enclosure from an infrared absorbing glass, and using an infrared heat source to concentrate heat in a small sealing zone on the glass tube.

Related Literature

The practice of using infrared energy to produce the glass-metal seals in a reed switch is described in detail in U.S. Pat. No. 3,660,064 granted May 2, 1972 to T. L. Rohde. This patent is particularly concerned with the arrangement of equipment in carrying out such a sealing operation. Glasses especially adapted to use in radiant sealing techniques are described for example in U.S. Pat. No. 3,445,256, granted May 20, 1969 to R. H. Dalton; U.S. Pat. No. 3,672,919, granted June 27, 1972 to W. Sack; and U.S. Pat. No. 3,698,921, granted Oct. 17, 1972 to C. M. LaGrouw et al.

My copending application, Ser. No. 569,861, filed of even date herewith, describes a reed switch construction wherein the reeds are composed of a magnetic, cobalt-iron-vanadium alloy having an average thermal coefficient of expansion between 95 and 105 × $10^{-7}$/°C. over the temperature range 25° to 300°C., and the glass envelope has a matching expansion below the glass setting point and is composed of 46–54% $SiO_2$, 2–8% $B_2O_3$, 0–4% $Li_2O$, 0–12% $Na_2O$, 0–10% $K_2O$, the $Li_2O + Na_2O + K_2O$ being 8–13%, 0–6% CaO, 13–20% BaO, 5–10% ZnO, the CaO + BaO + ZnO being 25–35%, 0–2% $TiO_2$, 0–4% $ZrO_2$ and 0.5–5.0% $Fe_2O_3$, all in percent by weight. In this construction, the glass is characterized by a relatively steep viscosity curve which enables producing the glass-metal seal at a low temperature, thus avoiding damage to the reeds during sealing.

U.S. Pat. No. 3,814,612, granted June 4, 1974 to K. Inoue et al. describes a reed switch embodying magnetic reeds composed of 73% to 93% cobalt, 1% to 5% nickel, and the balance iron. The glasses employed in constructing this switch are described as being resistant to devitrification, having coefficients of thermal expansion in the range of 110 to 130 × $10^{-7}$/°C. (0°–300°C.), and being composed essentially of 58–64% $SiO_2$, 3–5% $Al_2O_3$, 11–15% BaO, 18–23% $Na_2O + K_2O$ and 2–8% FeO.

The Invention

The present invention is based on a family of glasses that possess properties particularly suited to the production of tubular envelopes for reed switch construction. In particular, the glasses strongly absorb infra-red radiation, have high electrical resistivity values at elevated temperatures, have low liquidus temperatures and devitrification tendencies, and have expansion characteristics that enable them to match, below the glass setting point, cobalt-nickel-iron alloys such as those described in U.S. Pat. No. 3,814,612, mentioned above. The invention then is a reed switch embodying magnetic reeds as just mentioned, and characterized by a glass envelope formed from a glass consisting essentially of, in percent by weight on an oxide basis as calculated from the batch, 53–59% $SiO_2$, 3–7% $Al_2O_3$, 20–25% $Na_2O + K_2O$ wherein $K_2O:Na_2O$ ratio is greater than 1:1 on a weight basis, 7–10% BaO, 2–6% ZnO and 1–5% $Fe_2O_3$ and optionally containing up to 3% CaO, up to 1.5% $SnO_2$, and up to 1% $Sb_2O_3$.

Drawing

Figure 2:
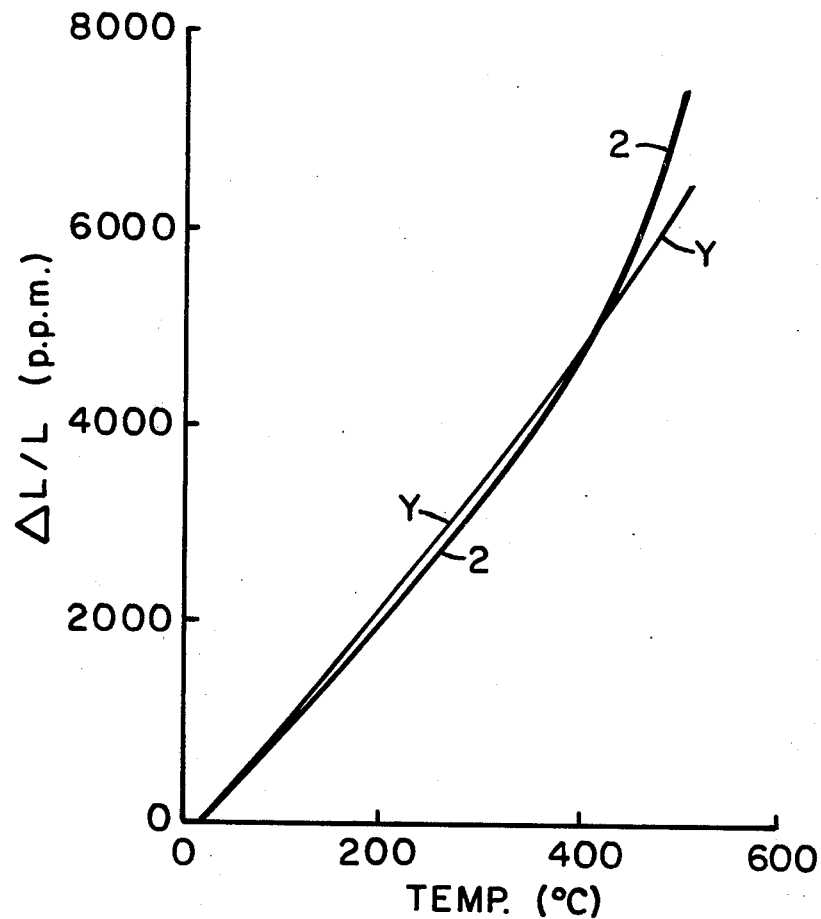

The invention is further described with reference to the accompanying drawing wherein, FIG. 1 is a schematic cross sectional view of a reed switch in accordance with the invention, and FIG. 2 is a graphical illustration comparing the thermal expansion characteristics of an alloy and a glass sealed in accordance with the present invention.

General Description

FIG. 1 illustrates, in simple schematic form, a reed switch 10 consisting of two elongated metal reeds 12 hermetically sealed within opposite ends of tubular glass envelope 14. Each of reeds 12 has a shank portion 16 encased within, and hermetically sealed to, a collapsed end portion 22 of tube 14. Reeds 12 also have generally flat, contacting strips 18 which are enclosed within tube 14 and overlap one another. Contact strips 18 are provided on their opposed contact surfaces 20 with a noble metal coating such as gold or silver. The present invention is particularly concerned with such a reed switch construction embodying an improved glass tube 14.

Metal reeds 12 may be drawn from a magnetic alloy having a composition consisting of cobalt, nickel and iron. These alloys are reported to have average expansion coefficients between 110 and 130 × $10^{-7}$/°C. over the temperature range of 0°C. to 300°C. While the present glasses have a somewhat lower expansion characteristic than the alloys over this range, they provide the necessary match over the range between 25°C. and the glass setting point.

The matter of expansion match is complicated somewhat by the fact that glasses and alloys generally do not have correspondng types of expansion curves. Thus, alloys tend to have a relatively constant expansion coefficient, as indicated by an essentially straight line type curve when the thermal expansion is plotted against temperature. The present glasses have a typical hook type curve caused by the expansion coefficient being greater at higher temperatures. This is illustrated in FIG. 2 wherein thermal expansion ($\Delta L/L$) in parts per million is plotted along the vertical axis, and temperature, in degrees Centigrade, is plotted along the horizontal axis. The straight line curve Y represents the expansion curve for an alloy composed of 85% cobalt, 12% iron and 3% nickel, and curve 2 is the expansion curve for the glass of Example 2 in TABLE I, infra.

It is customary to report expansion coefficient as an average value between 0°C. and 300°C. (0°–300°C.) or between 25°C. and 300°C. (25°–300°C.). However, in glass-metal seals, the significant temperature range is between 25°C. and the glass setting temperature, a temperature customarily taken as 5°C. above the glass strain point. Thus, the requirement for a strain-free seal is that the expansion curves match at the setting temperature of the glass; that is, a temperature on the order of 420°–450°C. for the present glasses. However, with reference to the alloys, the coefficient varies only by a small amount over this temperature range, and should be in the range of $110$–$130 \times 10^{-7}$/°C. To match these alloys, the glasses should have a strain point in the range of 420°–450°C. and a coefficient of thermal expansion of $100$–$120 \times 10^{-7}$/°C. over the temperature range of 25°C. to 300°C. (25°–300°C.).

In addition to the compatible thermal expansion characteristics just described, the present glasses are characterized by favorable liquidus temperatures and devitrification tendencies. Thus, not only do the glasses tend to have low liquidus temperatures at which crystallization is initiated, but the glass is very slow to crystallize even at these temperatures. In determining liquidus temperatures, it is customary to heat a glass sample in a gradient temperature furnace for a predetermined time and observe crystallization occurrence. Frequently, in a sixteen-hour test, no crystallization is observed with the present glasses. This, of course, is highly favorable for both glass forming and glass working practices.

Another property of significance is electrical resistivity, particularly when measured at elevated temperatures such as may be encountered in certain operating conditions. It is customary to specify electrical resistivity for electrical glasses at temperatures of 250°C. and 350°C. The present glasses generally provide resistivities having logarithmic values above 8.5 when measured at 250°C. and above 6.5 when measured at 350°C.

A particular compositional feature of the present glasses is the combination of $K_2O$ and $Na_2O$, more particularly with a $K_2O$:$Na_2O$ ratio greater than 1:1 by weight, and preferably on the order of 3:2 by weight (equivalent to 1:1 on a molar basis). This is critical to maintenance of the desired high electrical resistivity values.

Another particular feature is the presence of 2–6% ZnO in conjunction with BaO. This tends to improve the liquidus characteristics of the glass and increase its resistivity somewhat as compared to an all-BaO glass. The introduction of ZnO is particularly effective in conjunction with a low alumina content of 3–5%, although the presence of ZnO permits use of up to 7% $Al_2O_3$.

Silica is the glass former, and may be shifted in relation to the other oxides to control thermal expansion and physical properties. Silica contents greater than 59% generally depress thermal expansion below desired values.

Iron oxide functions as the infrared absorber in the glasses. At least 1% is required and 2–4% is preferred. This glass component is reported as $Fe_2O_3$ for convenience, although it will be understood that it must be predominantly in the ferrous state (FeO) to be an effective absorber. To this end, the batch ingredient preferred is ferrous oxalate. Also, up to 1% tin oxide may be employed to facilitate maintaining the iron in the ferrous state. Stronger reducing agents tend to produce iron metal in the melt. In the event that a fining agent is employed, up to 1% antimony oxide is preferred.

Other known glassmaking ingredients may be present in compatible small amounts for secondary purposes. For example, up to 3% CaO may be useful to control properties and facilitate melting; minor amounts of $ZrO_2$ and/or $TiO_2$ may be included to improve durability; the known colorants may be present if desired; and, up to 2% fluorine may be added to the batch to soften the glass.

The invention is further illustrated in TABLE I below which incorporates compositions and properties of four glasses complying with the compositional parameters of the present invention, as well as a comparison glass A. The compositions are in percent by weight as calculated from the glass batch on an oxide basis. Properties include softening point (Soft. Pt.), annealing point (Ann. Pt.), strain point (Str. Pt.), average coefficient of thermal expansion $\times 10^{-7}$ between 25°C. and 300°C. (Exp.), logarithm of electrical resistivity at 250°C. and 350°C. ($Log\ R_{250}$ and $Log\ R_{350}$), and liquidus (Liq.). All temperatures are in degrees Centigrade (°C.).

The liquidus measurement was made by heating a glass cane in a boat in a gradient furnace for 48 hours and then preparing a thin section from the cane for microscopic examination. The temperature at which crystallization initiated, if any, is thus identified. Where no value was found, there may still be a liquidus temperature, but this indicates the extended delay in initiation of crystallization.

TABLE I

|  | A | 1 | 2 | 3 | 4 |
|---|---|---|---|---|---|
| $SiO_2$ | 55.0 | 55.6 | 56.0 | 57.0 | 57.9 |
| $Al_2O_3$ | 9.6 | 4.0 | 4.0 | 4.0 | 3.9 |
| $Li_2O$ | 0.5 | — | — | — | — |
| $Na_2O$ | 7.5 | 8.8 | 8.65 | 8.65 | 8.50 |
| $K_2O$ | 14.3 | 13.3 | 13.05 | 13.05 | 12.75 |
| CaO | — | 1.0 | 1.0 | 1.0 | 1.0 |
| BaO | 9.0 | 9.0 | 9.0 | 9.0 | 8.8 |
| ZnO | — | 4.0 | 4.0 | 4.0 | 3.9 |
| $Fe_2O_3$ | 2.5 | 2.5 | 2.5 | 2.5 | 2.45 |
| $SnO_2$ | 0.8 | 1.0 | 1.0 | — | — |
| $Sb_2O_3$ | 0.8 | 0.8 | 0.8 | 0.8 | 0.8 |
| Soft. Pt. | 665 | — | 660 | 653 | 672 |
| Ann. Pt. | 466 | 477 | 477 | 471 | 483 |
| Str. Pt. | 424 | 435 | 437 | 432 | 442 |
| Exp. | 112.5 | 116 | 111 | 114 | 105 |

TABLE I-continued

|  | A | 1 | 2 | 3 | 4 |
|---|---|---|---|---|---|
| Log $R_{250}$ | — | — | 8.715 | 8.715 | 8.710 |
| Log $R_{350}$ | — | — | 6.860 | 6.860 | 6.895 |
| Liq. | 1000 | None | None | None | None |

The invention is further illustrated in TABLE II wherein Example 2 of TABLE I is repeated in conjunction with two comparison glasses B and C to demonstrate certain improved properties attained with the invention. Glass compositions and properties are presented as in TABLE I. It may be noted that glass 2 differs from glass B in the reversal of $Na_2O$ and $K_2O$ contents, whereas glass C differs primarily in the substitution of ZnO for BaO.

TABLE II

|  | 2 | B | C |
|---|---|---|---|
| $SiO_2$ | 56.0 | 56.0 | 58.0 |
| $Al_2O_3$ | 4.0 | 4.0 | 3.0 |
| $Li_2O$ | — | — | — |
| $Na_2O$ | 8.65 | 13.05 | 8.65 |
| $K_2O$ | 13.05 | 8.65 | 13.05 |
| CaO | 1.0 | 1.0 | — |
| BaO | 9.0 | 9.0 | 13.3 |
| ZnO | 4.0 | 4.0 | — |
| $Fe_2O_3$ | 2.5 | 2.5 | 4.0 |
| $SnO_2$ | 1.0 | 1.0 | — |
| $Sb_2O_3$ | 0.8 | 0.8 | — |
| Soft. Pt. | 660 | 638 | 628 |
| Ann. Pt. | 477 | 466 | 450 |
| Str. Pt. | 437 | 428 | 413 |
| Exp. | 111 | 114 | 117 |
| Log $R_{250}$ | 8.715 | 7.785 | 8.625 |
| Log $R_{350}$ | 6.860 | 6.105 | 6.820 |
| Liq. | None | None | 780 |

I claim:
1. A glass having a strain point between about 420°–450°C., a coefficient of thermal expansion (25°–300°C.) in the range of $100-120 \times 10^{-7}/°C.$, an electrical resistivity, Log R, of at least 8.5 as measured at 250°C. and at least 6.5 when measured at 350°C., and being composed essentially of, in percent by weight as calculated from the glass batch on an oxide basis, 53–59% $SiO_2$, 3–7% $Al_2O_3$, 20–25% $Na_2O + K_2O$ with a $K_2O:Na_2O$ ratio greater than 1.1 on a weight basis, 7–10% BaO, 2–6% ZnO, and 1–5% $Fe_2O_3$.

* * * * *